United States Patent
Altaf et al.

(10) Patent No.: US 12,508,947 B2
(45) Date of Patent: Dec. 30, 2025

(54) METHOD FOR DETERMINING AN ELECTRIC ENERGY STORAGE SYSTEM STATE-OF-POWER VALUE

(71) Applicant: VOLVO TRUCK CORPORATION, Gothenburg (SE)

(72) Inventors: Faisal Altaf, Västra Frölunda (SE); Anton Klintberg, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 767 days.

(21) Appl. No.: 17/757,640

(22) PCT Filed: Jun. 18, 2020

(86) PCT No.: PCT/EP2020/066874
§ 371 (c)(1),
(2) Date: Jun. 17, 2022

(87) PCT Pub. No.: WO2021/121672
PCT Pub. Date: Jun. 24, 2021

(65) Prior Publication Data
US 2023/0036362 A1 Feb. 2, 2023

(30) Foreign Application Priority Data
Dec. 20, 2019 (WO) ............... PCT/EP2019/086833
Dec. 20, 2019 (WO) ............... PCT/EP2019/086835

(51) Int. Cl.
*B60L 58/21* (2019.01)
*B60L 3/00* (2019.01)
(Continued)

(52) U.S. Cl.
CPC ............ *B60L 58/21* (2019.02); *B60L 3/0046* (2013.01); *B60L 58/10* (2019.02); *B60L 58/12* (2019.02);
(Continued)

(58) Field of Classification Search
CPC ............ G01R 31/3835; G01R 31/389; G01R 31/382; B60L 58/22; B60L 3/0046; B60L 58/10; H02J 7/0048
See application file for complete search history.

(56) References Cited

U.S. PATENT DOCUMENTS

2007/0145954 A1 6/2007 Kawahara et al.
2011/0313613 A1 12/2011 Kawahara et al.
(Continued)

FOREIGN PATENT DOCUMENTS

CN 102474118 A 5/2012
CN 104516394 A 4/2015
(Continued)

OTHER PUBLICATIONS

Chinese Office Action dated Dec. 13, 2024 in corresponding Chinese Patent Application No. 202080088059.4, 20 pages.
(Continued)

*Primary Examiner* — Minh Q Phan
(74) *Attorney, Agent, or Firm* — Jeffri A. Kaminski; Venable LLP

(57) ABSTRACT

A method for determining an electric energy storage system state-of-power value. The method includes for each battery unit in the electric energy storage system, determining the battery unit state-of-power value, the battery unit state-of-power value being indicative of the maximum amount of electric load that the battery unit can deliver or receive at a constant load level during the predetermined future time range without violating electro-thermal limits of the battery unit, for each battery unit in the electric energy storage system, obtaining a battery unit measured load value indicative of the electric load actually imparted on the battery unit at a certain time instant, on the basis of the battery unit measured load value for each battery unit in the electric energy storage system, determining a load distribution amongst the battery units of the electric energy storage
(Continued)

system, and determining the electric energy storage system state-of-power value on the basis of the battery unit state-of-power values and on the load distribution.

33 Claims, 2 Drawing Sheets

(51) Int. Cl.
*B60L 58/10* (2019.01)
*B60L 58/12* (2019.01)
*B60L 58/15* (2019.01)
*B60L 58/16* (2019.01)
*B60L 58/22* (2019.01)
*G01R 31/367* (2019.01)
*G01R 31/382* (2019.01)
*G01R 31/3835* (2019.01)
*G01R 31/389* (2019.01)
*H01M 10/42* (2006.01)
*H01M 10/48* (2006.01)
*H02J 7/00* (2006.01)

(52) U.S. Cl.
CPC ............... *B60L 58/15* (2019.02); *B60L 58/16* (2019.02); *B60L 58/22* (2019.02); *G01R 31/367* (2019.01); *G01R 31/382* (2019.01); *G01R 31/3835* (2019.01); *G01R 31/389* (2019.01); *H01M 10/425* (2013.01); *H01M 10/482* (2013.01); *H02J 7/0048* (2020.01); *H02J 7/0063* (2013.01); *B60L 2240/545* (2013.01); *B60L 2240/547* (2013.01); *B60L 2240/549* (2013.01); *B60L 2260/44* (2013.01); *H01M 2010/4271* (2013.01); *H01M 2220/20* (2013.01)

(56) References Cited

U.S. PATENT DOCUMENTS

| | | |
|---|---|---|
| 2012/0326671 A1 | 12/2012 | Krause |
| 2014/0129163 A1 | 5/2014 | Betzner |
| 2014/0214348 A1* | 7/2014 | Sahinoglu .......... G01R 31/3842 702/63 |
| 2014/0372053 A1 | 12/2014 | Lin et al. |
| 2016/0052418 A1 | 2/2016 | Yang et al. |
| 2018/0134160 A1 | 5/2018 | Kratzer |

FOREIGN PATENT DOCUMENTS

| | | |
|---|---|---|
| CN | 105270389 A | 1/2016 |
| CN | 105324907 A | 2/2016 |
| CN | 107107764 A | 8/2017 |
| DE | 102014216378 A1 | 2/2016 |
| EP | 3011655 B1 | 5/2017 |
| WO | 2017/215738 A1 | 12/2017 |
| WO | 2018/162023 A2 | 9/2018 |

OTHER PUBLICATIONS

International Search Report and Written Opinion in corresponding International Application No. PCT/EP2020/066874 mailed Sep. 16, 2020 (11 pages).

International Preliminary Report on Patentability in corresponding International Application No. PCT/EP2020/066874 mailed Mar. 7, 2022 (8 pages).

European Office Action dated Jul. 5, 2024 in corresponding European Patent Application No. 19832963.3, 7 pages.

* cited by examiner

METHOD FOR DETERMINING AN ELECTRIC ENERGY STORAGE SYSTEM STATE-OF-POWER VALUE

CROSS-REFERENCE TO RELATED APPLICATIONS

This application is a U.S. National Stage application of PCT/EP2020/066874, filed Jun. 18, 2020 and published on Jun. 24, 2021, as WO 2021/121672, which claims the benefit of International Patent Application Nos. PCT/EP2019/086833 filed on Dec. 20, 2019, and PCT/EP2019/086835 filed on Dec. 20, 2019, all of which are hereby incorporated by reference in their entireties.

TECHNICAL FIELD

The present disclosure relates to a method for determining an electric energy storage system state-of-power value. Additionally, the present disclosure relates to a method for controlling the loading of an electric energy storage system. Moreover, the present disclosure relates to a battery management system for an electric energy storage system. Further, the present disclosure relates to an electric energy storage system.

BACKGROUND

Energy storage systems are frequently used in a wide variety of applications and fields of technology. In the automotive industry, energy storage systems may be used for propulsion of a vehicle as well as for providing electrical energy to various systems of a vehicle. As another non-limiting example, energy storage systems may be used in stationary energy storage applications, for instance in so called smart grid and power back-up applications.

In order to increase the power capability of the energy storage system, a solution can be provided where two or more battery modules/battery packs of the energy storage system are coupled in parallel to each other. Hereby, the individual battery modules can be easily connected to, or disconnected from, each other. Also, an increased total power capability is provided in comparison to using only a single battery module/battery pack.

However, a problem with energy storage systems having battery modules connected in parallel is that the battery modules need to be in approximately the same physical state for optimal energy usage. It is however a common scenario that the battery modules/battery packs are not in the same physical state. For example, if the parallel connected battery modules are differently aged, i.e. one of the battery modules has been recently replaced by a new and unused battery module, there will most likely be a difference in power capability between the differently aged battery modules. For instance, the older and weaker battery module may have a complicated dynamic interaction with the new and more powerful battery module and may thus pull down the total available power of this joint system as compared to their individual sum. In short, the maximum available power of the energy storage system will be limited by the weakest link in the system, i.e. the oldest battery module.

Also, care should be taken when mixing battery modules/packs of different generation/types of in an energy storage system, since their characteristics, such as internal resistance, open-circuit-voltage (OCV), capacity, etcetera, may be significantly different from each other. Another example is that if one of the battery modules has a higher temperature than the other battery modules of the same energy storage system, the resistance of the battery module having elevated temperature will most likely be lower than the resistance of the battery modules having lower temperature. In such a situation, there is a risk that the warmer battery module will receive a charge current exceeding its threshold.

Another problem with energy storage systems having parallel connected battery modules is that different battery packs may be placed in different locations of the vehicle, and may thus require high-voltage cables of different lengths, thereby introducing large differences in resistances.

A typical approach to solve the above-mentioned problem is disclosed in EP 3 011 655, and is based on utilization of the battery units based on constraints dictated by a weakest link in the network, i.e. by the battery pack having the lowest state-of-power. The method of EP 3 011 655 uses a substantially conservative approach where the lowest maximum power capability of one of the battery packs is multiplied by the total number of battery packs in order to get the total power capability of the energy storage system. By using this worst case scenario some of the battery packs may not be fully used i.e. may not deliver/receive power according to their maximum discharge/charge power ability. There is hence a need for improved controlling of charge and discharge capability for energy storage systems having battery units coupled in parallel.

SUMMARY

In view of the above, an object of a first aspect of the present disclosure is to provide a method implying an appropriate use of an electric energy storage system.

As such, a first aspect of the present disclosure relates to a method for determining an electric energy storage system state-of-power value. The electric energy storage system comprises at least two battery units electrically connected in parallel to each other. The electric energy storage system state-of-power value is indicative of the total maximum amount of electric load that an electric energy storage system can deliver or receive at a constant load level during a predetermined future time range without violating a state-of-power, defined by a state-of-power value, for any one of the battery units. Purely by way of example, the method may be computer implemented.

The method according to the first aspect of the present disclosure comprises:

for each battery unit in the electric energy storage system, determining the battery unit state-of-power value, the battery unit state-of-power value being indicative of the maximum amount of electric load that the battery unit can deliver or receive at a constant load level during the predetermined future time range without violating electro-thermal limits of the battery unit, for each battery unit in the electric energy storage system, obtaining a battery unit measured load value indicative of the electric load actually imparted on the battery unit at a certain time instant, on the basis of the battery unit measured load value for each battery unit in the electric energy storage system, determining a load distribution amongst the battery units of the electric energy storage system, and determining the electric energy storage system state-of-power value on the basis of the battery unit state-of-power values and on the load distribution.

As such, according to the first aspect of the present disclosure, not only the state-of-power for each battery unit in the electric energy storage system is taken into account, but also the load distribution amongst the battery units when determining an electric energy storage system state-of-power value. This in turn implies an appropriate accuracy of the electric energy storage system state-of-power value since not only the characteristics of each battery as such is regarded. Instead, by virtue of the load distribution indicated above, due regard to e.g. the configuration of the electric energy storage system and/or the present internal state of each battery unit may also be given.

Furthermore, the use of measured load values implies that an appropriate electric energy storage system state-of-power value may be determined without a need for detailed information as regards each individual battery unit and/or the electric energy storage system. Purely by way of example, the state-of-power value may be determined without a need for information such as internal resistance, health, temperature, capacity etcetera of each battery unit.

As used herein, the term "battery unit" should in the following and throughout the entire application be interpreted as to encompass a battery module as well as a battery pack, which in turn may comprise one or more battery modules. Still further, the wording "battery unit" should be understood to also include a unit which may comprise a plurality of battery packs. Accordingly, the wording "battery unit" may be a battery module comprising at least one battery cell, a battery pack which comprises at least two battery modules, as well as a unit which comprises at least two battery packs.

By the term "predetermined future time range" is meant a time period from a given instant to a time point in the future. The predetermined future time range in the context of the present disclosure may for instance be short (1-5 s, preferably 2-3 s), medium (5-15 s, preferably 10-12 s), or long (15-60 s or even longer than 60 s, preferably 30-40 s). Preferably, the predetermined future time range may be in the range of 30-40 s.

Optionally, the step of determining the load distribution comprises determining a load sharing factor for each one of the battery units. The load sharing factor is indicative of the proportion of the total electric load of the electric energy storage system being imparted on the battery unit.

Optionally, the load sharing factor is determined in accordance with the following:
determining an electric load reference value indicative of the total electric load actually imparted on the electric energy storage system,
determining whether or not a load sharing condition is fulfilled, the load sharing condition comprising that the magnitude of the electric load reference value is greater than or equal to a predetermined first threshold value, and
for each battery unit:
i. in response to the load sharing condition being fulfilled, setting the load sharing factor for the battery unit to the ratio between the electric load reference value and the battery unit measured load value.

Purely by way of example, the electric load reference value indicative of the total electric load actually imparted on the electric energy storage system may be a value indicative of the total electric load imparted on the electric energy storage system. Put differently, the electric load reference value may be formed by summing the electric load over each battery unit in the electric energy storage system. As another non-limiting alternative, the electric load reference value may be indicative of the average electric load over each battery unit in the electric energy storage system.

Optionally, the load sharing factor further is determined in accordance with the following:
for each battery unit:
ii. in response to the load sharing condition not being fulfilled, setting the load sharing factor for the battery unit to a predetermined load sharing parameter, preferably the predetermined load sharing parameter is equal to one.

Optionally, the load sharing condition is individual for each battery unit and further comprises that a magnitude of the battery unit measured load value is greater than or equal to a predetermined second threshold value, preferably the predetermined second threshold value is greater than zero.

As such, the load sharing condition may comprise a condition that the measured load value for a battery unit is relatively large. When the load level is relatively large, the behavior of the battery unit may be predicted with a relatively high level of certainty and the battery unit concerned may be assigned a load sharing factor.

Optionally, the load sharing condition is individual for each battery unit and further comprises that a magnitude of the battery unit measured load value is greater than or equal to a magnitude of the battery unit state-of-power value multiplied by a predetermined third threshold value, preferably the predetermined third threshold value is in the range of zero to one.

Again, the load sharing condition may comprise a condition that the measured load value for a battery unit is relatively large, e.g. relatively close to the battery unit state-of-power value. When the load level is relatively large, the behavior of the battery unit may be predicted with a relatively high level of certainty and the battery unit concerned may be assigned a load sharing factor. Purely by way of example, the internal resistance of batteries may be load dependent. As such, the load sharing factor may be different when the present measured load is far from the battery unit's maximum load. Therefore, as a non-limiting example, the load sharing factor according to the above-mentioned ratio may be calculated only when a measured load, e.g. current, in a battery unit is close to either its maximum charge load (e.g. current) ability or its maximum discharge load (e.g. current) ability.

Optionally, the step of determining the electric energy storage system state-of-power value comprises, for each battery unit in the electric energy storage system, determining a battery unit product by multiplying the battery unit state-of-power value and the load sharing factor.

Optionally, the step of determining the electric energy storage system state-of-power value comprises using the battery unit product, among the battery unit products, which is closest to zero for determining the electric energy storage system state-of-power value. Optionally, the battery unit state-of-power value is a battery unit state of charging power value and the electric energy storage system state-of-power value is an electric energy storage system state of charging power value.

Optionally, the step of determining the electric energy storage system state-of-power value comprises using the smallest battery unit product, among the battery unit products, for determining the electric energy storage system state-of-power value.

Optionally, the battery unit state-of-power value is a battery unit state of discharging power value and the electric energy storage system state-of-power value is an electric energy storage system state of discharging power value.

Optionally, the step of determining the electric energy storage system state-of-power value comprises using the largest battery unit product, among the battery unit products, for determining the electric energy storage system state-of-power value.

Optionally, the method further comprises:
for each one of a plurality of time instants, determining an electric energy storage system state-of-power value for that time instant using any embodiment of the method of the first aspect of the present disclosure, and
determining said electric energy storage system state-of-power value by applying a filter, preferably a low pass filter and/or a weighted moving average filter, to the electric energy storage system state-of-power values for the plurality of time instants.

The above filtering implies that e.g. large fluctuations in the electric energy storage system state-of-power values due to e.g. noisy current and voltage measurements may be reduced.

A second aspect of the present disclosure relates to a method for controlling the loading of an electric energy storage system comprising at least two battery units electrically connected in parallel to each other. The method comprises determining the electric energy storage system state-of-power value according to the first aspect of the present disclosure, and imparting an electric load on the energy storage system in dependence on the thus determined electric energy storage system state-of-power value.

Optionally, imparting an electric load on the energy storage system in dependence on the thus determined electric energy storage system state-of-power value comprises imparting an electric load the absolute value of which being smaller than or equal to the absolute value of the thus determined electric energy storage system state-of-power value.

Optionally, the battery unit measured load value is indicative of the electric current, alternatively electric power, actually imparted on the battery unit at a certain time instant. Optionally, the electric energy storage system state-of-power value is indicative of the total maximum amount of electric current, alternatively electric power, that an electric energy storage system can deliver or receive at a constant load level during the predetermined future time range without violating a state-of-power, defined by a state-of-power value, for any one of the battery units and wherein the battery unit state-of-power value is indicative of the maximum amount of electric current, alternatively electric power, that the battery unit can deliver or receive at a constant load level during the predetermined future time range without violating electro-thermal limits of the battery unit.

A third aspect of the present disclosure relates to a computer program comprising program code means for performing the steps of the first or second aspect of the present disclosure when the program is run on a computer.

A fourth aspect of the present disclosure relates to a computer readable medium carrying a computer program comprising program means for performing the steps of the first or second aspect of the present disclosure when the program means is run on a computer.

A fifth aspect of the present disclosure relates to a battery management system for an electric energy storage system comprising at least two battery units electrically connected in parallel to each other. The battery management system is adapted to determine an electric energy storage system state-of-power value. The electric energy storage system state-of-power value is indicative of the total maximum amount of electric load that an electric energy storage system can deliver or receive at a constant load level during a predetermined future time range without violating a state-of-power, defined by a state-of-power value, for any one of said battery units, in accordance with the following:
for each battery unit in the electric energy storage system, determine the battery unit state-of-power value, the battery unit state-of-power value being indicative of the maximum amount of electric load that the battery unit can deliver or receive at a constant level during the predetermined future time range without violating electro-thermal limits of said battery unit,
for each battery unit in the electric energy storage system, receive a battery unit measured load value indicative of the electric load actually imparted on the battery unit at a predetermined time instant,
on the basis of the measured load value for each battery unit in the electric energy storage system, determine a load distribution amongst the battery units of the electric energy storage system, and
determine the electric energy storage system state-of-power value on the basis of the battery unit state-of-power values and on the load distribution.

Optionally, the battery management system is adapted to determine the load distribution using a procedure that comprises determining a load sharing factor for each one of the battery units, the load sharing factor being indicative of the proportion of the total electric load of the electric energy storage system being imparted on the battery unit.

Optionally, the battery management system is adapted to determine the load sharing factor in accordance with the following:
determining an electric load reference value indicative of the total electric load actually imparted on the electric energy storage system,
determining whether or not a load sharing condition is fulfilled, the load sharing condition comprising that the absolute value of the electric load reference value is greater than or equal to a predetermined first threshold value, and
for each battery unit:
i. in response to the load sharing condition being fulfilled, setting the load sharing factor for the battery unit to the ratio between the electric load reference value and the battery unit measured load value.

Optionally, the battery management system is further adapted to determine the load sharing factor accordance with the following:
for each battery unit:
ii. in response to the load sharing condition not being fulfilled, setting the load sharing factor for the battery unit to a predetermined load sharing parameter, preferably the predetermined load sharing parameter is equal to one.

Optionally, the load sharing condition is individual for each battery unit and further comprises that a magnitude of the battery unit measured load value is greater than or equal to a predetermined second threshold value. Preferably, the predetermined second threshold value is greater than zero.

Optionally, the load sharing condition is individual for each battery unit and further comprises that a magnitude of the battery unit measured load value is greater than or equal to a magnitude of the battery unit state-of-power value multiplied by a predetermined third threshold value. Preferably, the predetermined third threshold value is in the range of zero to one.

Optionally, the battery management system is adapted to determine the electric energy storage system state-of-power value using a procedure that comprises, for each battery unit in the electric energy storage system, determining a battery unit product by multiplying the battery unit state-of-power value and the load sharing factor.

Optionally, the battery management system is adapted to determine the electric energy storage system state-of-power value by using a procedure that comprises using the battery unit product, among the battery unit products, which is closest to zero for determining the electric energy storage system state-of-power value.

Optionally, the battery unit state-of-power value is a battery unit state of charging power value and the electric energy storage system state-of-power value is an electric energy storage system state of charging power value.

Optionally, the battery management system is adapted to determine the electric energy storage system state-of-power value by using a procedure that comprises using the smallest battery unit product, among the battery unit products, for determining the electric energy storage system state-of-power value.

Optionally, the battery unit state-of-power value is a battery unit state of discharging power value and the electric energy storage system state-of-power value is an electric energy storage system state of discharging power value.

Optionally, the battery management system is adapted to determine the electric energy storage system state-of-power value using a procedure that comprises using the largest battery unit product, among the battery unit products, for determining the electric energy storage system state-of-power value.

Optionally, the battery management system is adapted to:
for each one of a plurality of time instants, determine an electric energy storage system state-of-power value for that time instant as has been discussed above in relation to the fifth aspect of the present disclosure, and
determine said electric energy storage system state-of-power value by applying a filter, preferably a low pass filter and/or a weighted moving average filter, to said electric energy storage system state-of-power values for said plurality of time instants.

Optionally, the battery management system is adapted to impart an electric load on the energy storage system in dependence on the determined electric energy storage system state-of-power value.

Optionally, the battery management system is adapted to impart an electric load on the energy storage system in dependence on the thus determined electric energy storage system state-of-power value by imparting an electric load the absolute value of which being smaller than or equal to the absolute value of the thus determined electric energy storage system state-of-power value.

Optionally, the battery unit measured load value is indicative of the electric current, alternatively electric power, actually imparted on the battery unit at a certain time instant.

Optionally, the electric energy storage system state-of-power value is indicative of the total maximum amount of electric current, alternatively electric power, that an electric energy storage system can deliver or receive at a constant load level during the predetermined future time range without violating a state-of-power, defined by a state-of-power value, for any one of said battery units and wherein the battery unit state-of-power value is indicative of the maximum amount of electric current, alternatively electric power, that the battery unit can deliver or receive at a constant load level during the predetermined future time range without violating electro-thermal limits of said battery unit.

A sixth aspect of the present disclosure relates to an electric energy storage system comprising at least two battery units electrically connected in parallel to each other.

The electric energy storage system further comprises a battery management system according to the fifth aspect of the present disclosure.

A seventh aspect of the present disclosure relates to vehicle comprising a battery management system according to the fifth aspect of the present disclosure and/or an electric energy storage system according to the sixth aspect of the present disclosure.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

Figure 1:
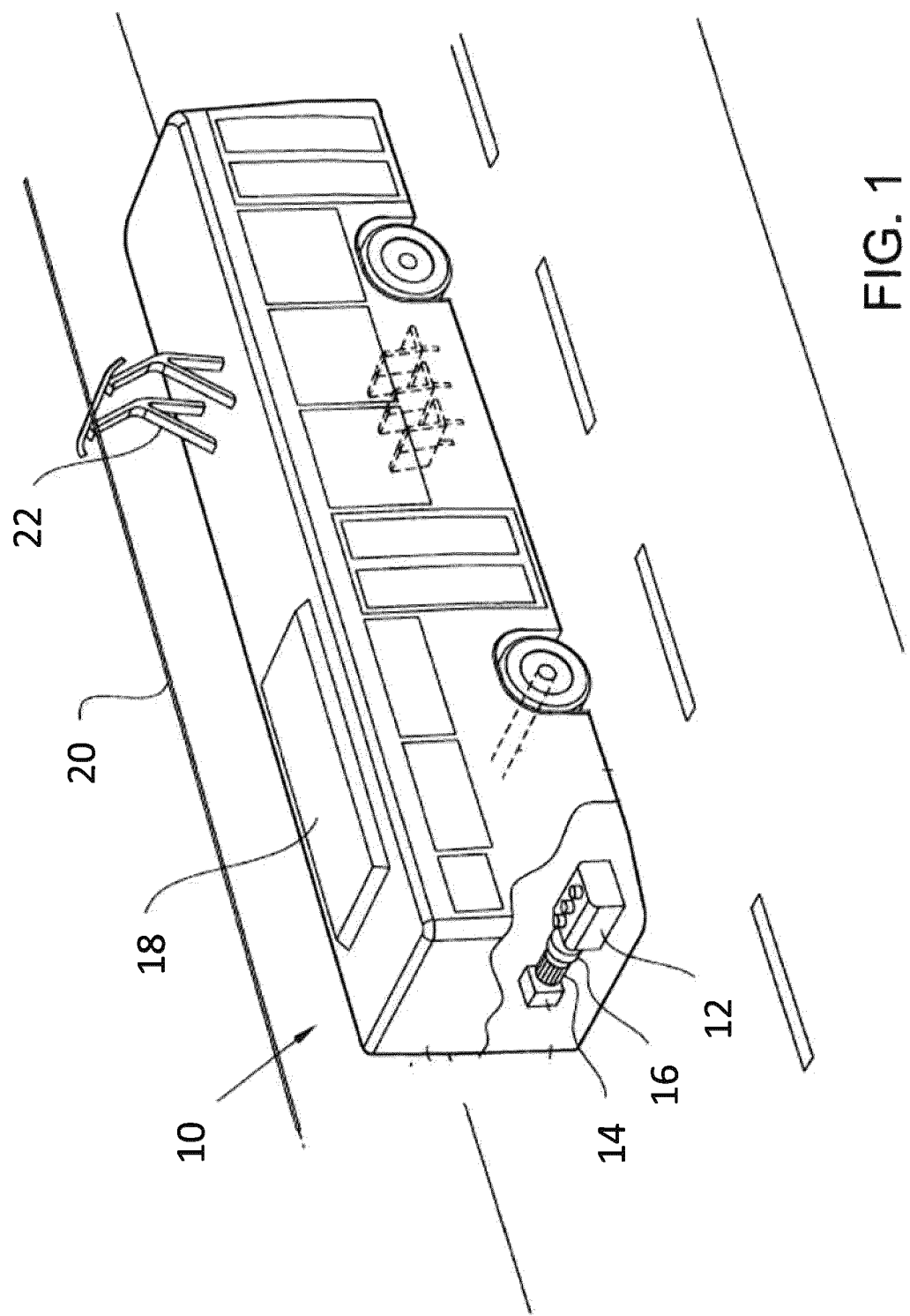
FIG. 1 schematically illustrates a hybrid vehicle in the form of a bus, in which the present disclosure can be used, and FIG. 2 schematically illustrates an embodiment of an electric energy storage system.

With reference to the appended drawings, below follows a more detailed description of embodiments of the disclosure cited as examples.

DETAILED DESCRIPTION OF PREFERRED EMBODIMENTS

The present disclosure will now be described more fully hereinafter with reference to the accompanying drawings, in which exemplary embodiments of the present disclosure are shown. The disclosure may, however, be embodied in many different forms and should not be construed as limited to the embodiments set forth herein; rather, these embodiments are provided for thoroughness and completeness. The skilled person will recognize that many changes and modifications may be made within the scope of the appended claims.

Similar reference characters refer to similar elements throughout the description.

FIG. 1 illustrates a simplified perspective view of a vehicle in the form of a bus 10 according to an embodiment of the present disclosure. In fact, the FIG. 1 embodiment of the vehicle 10 is of the plug-in hybrid type which is equipped with an internal combustion engine 12 and an electric machine 14 which are connected to each other via a clutch 16 and wherein both the internal combustion engine 12 and the electrical machine 14 can be used to drive the bus 10. It is also contemplated that the vehicle 10 may be an electrical vehicle not comprising an internal combustion engine for the propulsion of the vehicle. Even though the present disclosure is described with reference to a vehicle in the form of a bus, it can be used for virtually any type of system for storing electric energy. FIG. 1 further illustrates that the vehicle 1 comprises an electric energy storage system 18 which for instance may be adapted to power the electrical machine 14 and/or other electrical components (not shown) of the vehicle 10.

Purely by way of example, and as indicated in FIG. 1, the electric energy storage system 18 may be charged via an overhead wire 20 and a pantograph 22. However, it is also contemplated that the electric energy storage system 18 may be charged using other means (not shown in FIG. 1).

As may be realized from the above, the electric energy storage system 18 may be charged with electric power and/or electric power may be discharged from the electric energy storage system 18.

Figure 2:
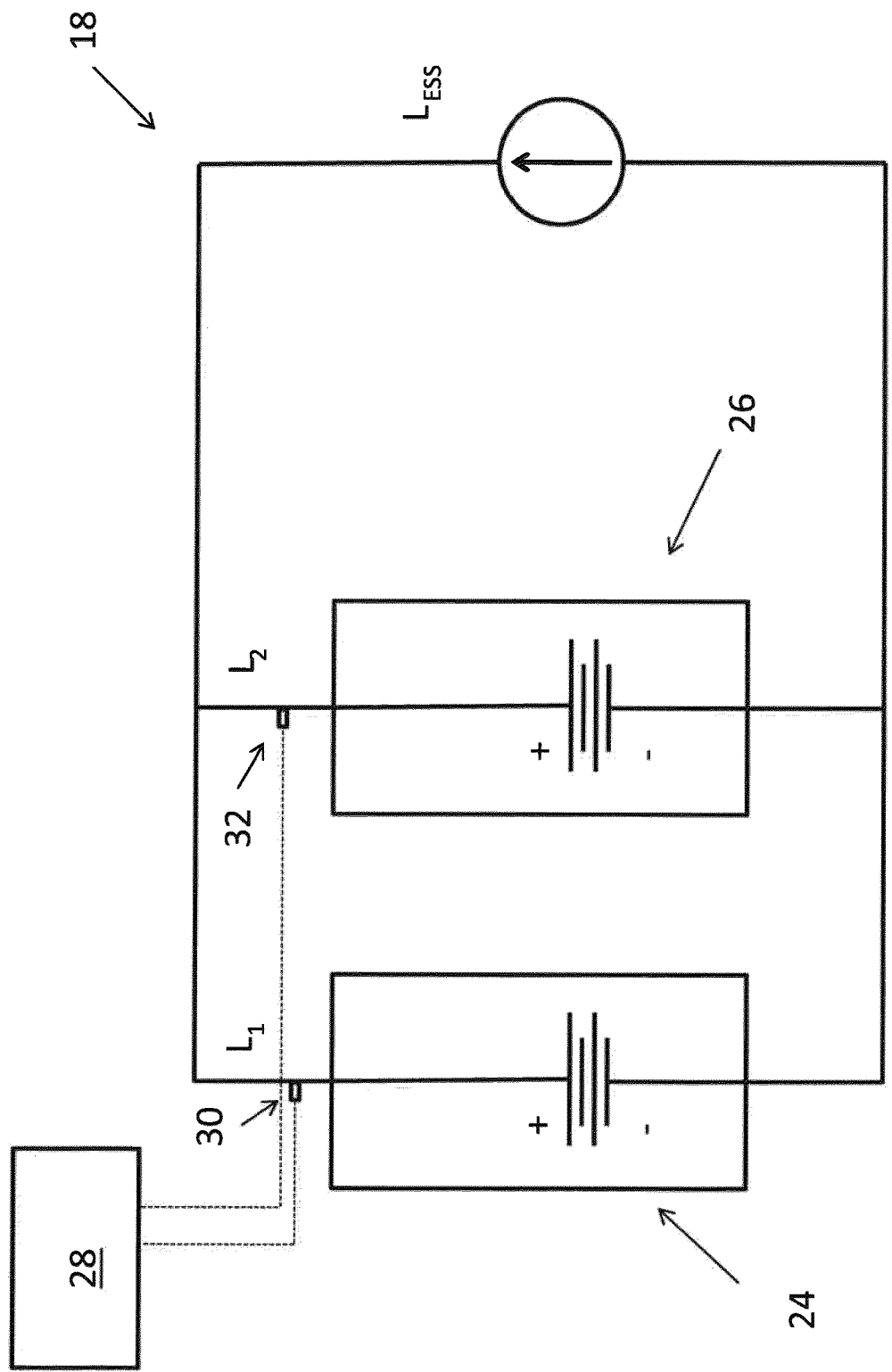

FIG. 2 schematically illustrates an embodiment of the electric energy storage system 18. Purely by way of example, the FIG. 2 electric energy storage system 18 may be used for powering a vehicle, such as the FIG. 1 vehicle 10. However, embodiments of the electric energy storage system 18 according to the present disclosure may be used for any application delivering and/or requiring electric power. Purely by way of example, embodiments of the electric energy storage system 18 may be used in a stationary energy storage application (not shown) as well like in smart grid, back-up power, charger support or the like.

As may be gleaned from FIG. 2, the electric energy storage system 18 comprises at least two battery units 24, 26 electrically connected in parallel to each other. Although the FIG. 2 embodiment of the electric energy storage system 18 contains only two battery units, it is envisage that other embodiments may comprise more than two battery units (not shown).

The battery units according to the present disclosure may be same or different, and may for instance be of lithium-ion or sodium-ion type. A sodium-ion battery typically includes any type of sodium iron battery or sodium ferrite battery.

FIG. 2 further illustrates that the electric energy storage system 18 may further comprise a battery management system 28. Purely by way of example, and as exemplified in FIG. 2, the battery management system 28 may be adapted to receive information from the electric energy storage system 18. Purely by way of example, the battery management system 28 may be adapted to receive information indicative of the electric load actually imparted on each battery unit 24, 26 at a certain time instant. To this end, though purely by way of example, the battery management system 28 may be in communication with a set of electric load sensors 30, 32 wherein each load sensor 30, 32 is adapted to determine a value indicative of the electric load imparted on a battery unit of the electric energy storage system 18. Purely by way of example, each one of the electric load sensors 30, 32 may be adapted to measure electric power, e.g. by measuring electric current as well as voltage.

As a non-limiting example, the battery management system 28 may be adapted to receive information indicative of the electric current actually imparted on each battery unit 24, 26 at a certain time instant. In such an example, the electric load sensors 30, 32 may be adapted to measure electric current.

Instead of, or in addition to, the above-mentioned battery management system 28, embodiments of the electric energy storage system 18 may comprise individual battery management units (not shown in FIG. 2) for each battery unit 24, 26. Purely by way of example, such an individual battery management unit may receive and process measurement data (e.g. (current, voltages, and temperatures) relating to the associated battery unit 24, 26 and forward information to an electric energy storage system corresponding to e.g. an electric energy storage system control unit (not shown).

The present disclosure relates to a method for determining an electric energy storage system state-of-power value as well as to a battery management system for an electric energy storage system adapted to determine an electric energy storage system state-of-power value. In order to keep the description brief, the below description generally uses the method for presenting various features of the present disclosure. However, it should be noted that the description of the method should be equally applicable to the battery management system and vice versa.

As such, a first aspect of the present disclosure relates to a method for determining an electric energy storage system state-of-power value. Such a value is hereinafter referred to as $SOP_{ESS}$ or $SOP_{ESS}(k)$. The electric energy storage system state-of-power value $SOP_{ESS}$ is indicative of the total maximum amount of electric load that an electric energy storage system 18, such as the FIG. 2 electric energy storage system 18, can deliver or receive at a constant load level during a predetermined future time range without violating a state-of-power, defined by a state-of-power value $SOP_i$ or $SOP_i(k)$, for any one of the battery units 24, 26. As has been intimated above, the electric energy storage system 18 comprises at least two battery units 24, 26 electrically connected in parallel to each other.

The method according to the first aspect of the present disclosure may comprise the below presented features.

As such, the method comprises: for each battery unit 24, 26 in the electric energy storage system 18, determining the battery unit state-of-power value $SOP_i$, the battery unit state-of-power value $SOP_i$ being indicative of the maximum amount of electric load that the battery unit 24, 26 can deliver or receive at a constant load level during the predetermined future time range without violating electro-thermal limits of the battery unit 24, 26. As will be elaborated on hereinbelow, the battery unit state-of-power value $SOP_i$ may be for instance be expressed in terms of an electric charging and/or discharging current or electric charging and/or discharging power.

Moreover, the method comprises: for each battery unit 24, 26 in the electric energy storage system 18, obtaining a battery unit measured load value $L_1$, $L_2$ indicative of the electric load actually imparted on the battery unit at a certain time instant. As for the battery unit state-of-power value $SOP_i$, the battery unit measured load value may also be expressed in terms of an electric current or electric power.

Additionally, the method comprises: on the basis of the battery unit measured load value $L_1$, $L_2$ for each battery unit 24, 26 in the electric energy storage system 18, determining a load distribution amongst the battery units 24, 26 of the electric energy storage system 18.

Furthermore, the method comprises: determining the electric energy storage system state-of-power value $SOP_{ESS}$ on the basis of the battery unit state-of-power values $SOP_i$ and on the load distribution.

The above method will be presented further hereinbelow.

As regards the determination of the battery unit state-of-power value SOP for each battery unit 24, 26 in the electric energy storage system 18, such a determination may be performed in a plurality of different ways. As a non-limiting example, a supplier of battery unit may provide information indicative of the battery unit state-of-power value $SOP_i$. As another non-limiting example, the battery unit state-of-power value $SOP_i$ may be determined before adding the battery unit to an electric energy storage system 18, for instance using a test procedure or the like.

With reference to FIG. 2, the state-of-power value $SOP_i$ for each battery unit 24, 26 may be determined using individual battery management units (not shown in FIG. 2) as have been discussed above. Alternatively, the state-of-power value $SOP_i$ for each battery unit 24, 26 may be determined using a central system, such as the battery management system 28 in FIG. 2.

Purely by way of example, the battery unit state-of-power value $SOP_i$ may be set to be constant over a certain time period. As another non-limiting example, the battery unit state-of-power value $SOP_i$ may be set to be time dependent and may thus be denoted as $SOP_i(k)$ for instance.

As other non-limiting examples, the battery unit state-of-power value $SOP_i$ may be determined using a single battery model as will be discussed hereinbelow.

As a first example, the battery unit state-of-power value $SOP_i$ may simply be equated to the maximum current that can be imparted on the battery unit. As such, the battery unit state-of-power value $SOP_i$ may be expressed in accordance with the following:

$$SOP_i = I_i^{max} \qquad \text{Eq. 1}$$

It should be noted that the maximum current may be different depending on whether electric current is charged to or discharged from the battery unit. As such, a battery unit may be associated with two state-of-power values: a charge state-of-power value $SOP_{i,charge}$ and a discharge state-of-power value $SOP_{i,discharge}$, in accordance with the following:

$$SOP_{i,charge} = I_{i,charge}^{max}$$

$$SOP_{i,discharge} = I_{i,discharge}^{max} \qquad \text{Eq. 2}$$

As a non-limiting example, a single battery model may comprise an open circuit voltage $V_{oci}$, an internal resistance $R_{Di}$, a minimum voltage limit $V_i^{min}$ and a maximum voltage limit $V_i^{max}$. Purely by way of example, the above parameters may be static value or values that are assumed to be constant for a certain time range, such as the predetermined future time range discussed above. It should be noted that a single battery model also may comprise additional terms, e.g. one or more RC pairs for modelling dynamic concentration and activation polarizations inside battery cells.

As such, in a simplified form, the battery unit state-of-power value $SOP_i$, defined in terms of electric power, may be determined in accordance with the following:

$$SOP_i = I_i^{max} \cdot V_i^{min} = \frac{(V_i^{min} - V_{OCi})}{R_{0i}} \cdot V_i^{min} \qquad \text{Eq. 3}$$

Here, it should be noted that the open circuit voltage $V_{oci}$ can be modelled so as to be dependent on the state of charge $SOC_i$ of the battery unit. Moreover, the state of charge $SOC_i$ may be a time dependent parameter. As such, Eq. 3 can be formulated in accordance with the following:

$$SOP_i(t) = I_i^{max}(t) \cdot V_i^{min} = \frac{(V_i^{min} - V_{OCi}(SOC_i(t)))}{R_{0i}} \cdot V_i^{min} \qquad \text{Eq. 4}$$

It should be noted that the internal resistance $R_{Di}$ may also be dependent on whether electric current is charged to or discharged from the battery unit. As such, the battery unit may comprise a charging internal resistance $R_{Di,charge}$, as well as a discharging internal resistance $R_{Di,discharge}$. As such, in analogy with Eq. 2, battery unit may be associated with two state-of-power values in accordance with the following:

$$SOP_{i,charge}(t) = I_{i,charge}^{max}(t) \cdot V_i^{max} = \frac{(V_i^{max} - V_{OCi}(SOC_i(t)))}{R_{0i,charge}} \cdot V_i^{max} \qquad \text{Eq. 5}$$

$$SOP_{i,discharge}(t) = I_{i,discharge}^{max}(t) \cdot V_i^{min} = \frac{(V_i^{min} - V_{OCi}(SOC_i(t)))}{R_{0i,discharge}} \cdot V_i^{min}$$

For the sake of completeness, it should be noted that the maximum current for a battery unit, be it a charging or a discharging current, may be determined in a plurality of different ways. Purely by way of example, the maximum current may be determined in a test environment.

Optionally, as a general formulation, the maximum current may be determined using an optimization procedure taking e.g. the thermal dynamics and the state of charge limits of the battery unit into account.

Purely by way of example, using an example in which the state-of-power $SOP_i$ is defined in terms of electric current, the state-of-power may be determined by solving the maximization problem in Eq. 6 hereinbelow using the boundary conditions (i.e., electro-thermal constraints) as presented in Eq. 7 to Eq. 14 for a predetermined future time range $\Delta t$.

$$\max |I_i| \forall t \in [t, t+\Delta t] \qquad \text{Eq. 6}$$

subject to:

Electrical dynamics: $\dot{x}_e(t) = f_e(x_e, x_T, I_i)$ \qquad Eq. 7

Thermal dynamics: $\dot{x}_T(t) = f_T(x_T, x_e, I_i)$ \qquad Eq. 8

Battery Voltage Output: $V_i(t) = f_1(x_e, x_T, I_i)$ \qquad Eq. 9

Battery Temperature: $T_i(t) = f_2(x_T, x_e, I_i)$ \qquad Eq. 10

State-Of-Charge Limits: $SoC_i^{min} \leq SoC_i(t+\Delta t) \leq SoC_i^{max}$ \qquad Eq. 11

Voltage Limits: $V_i^{min} \leq V_i(t+\Delta t) \leq V_i^{max}$ \qquad Eq. 12

Temperature Limits: $T_i^{min} \leq T_i(t+\Delta t) \leq T_i^{max}$ \qquad Eq. 13

Current Limits: $I_i^{min} \leq I_i(t:t+\Delta t) \leq I_i^{max}$ \qquad Eq. 14

Irrespective of how the battery unit state-of-power value $SOP_i$ is determined for each one of the battery units in the electric energy storage system 18, the electric energy storage system state-of-power value $SOP_{ESS}$ may be determined using the method of the present disclosure. As has been intimated hereinabove, the method comprises determining a load distribution amongst the battery units 24, 26 of the electric energy storage system 18.

Here, it should be noted that the term "load" may relate to an electric current or an electric power. As such, the battery unit measured load value may be indicative of the electric current, alternatively electric power, actually imparted on the battery unit 24, 26 at a certain time instant.

Moreover, though purely by way of example, the electric energy storage system state-of-power value is indicative of the total maximum amount of electric current, alternatively electric power, that an electric energy storage system can deliver or receive at a constant load level during the predetermined future time range without violating a state-of-power, defined by a state-of-power value $SOP_i$; $SOP_i(k)$, for any one of the battery units and wherein the battery unit state-of-power value is indicative of the maximum amount of electric current, alternatively electric power, that the battery unit can deliver or receive at a constant load level during the predetermined future time range without violating electro-thermal limits of the battery unit 24, 26.

Furthermore, it should not be overlooked that each battery unit 24, 26, as well as the electric energy storage system 18, may have two different state-of-power values, viz a charging state-of-power value and a discharging state-of-power value.

It is envisaged that embodiments of the present disclosure will only determine one of the electric energy storage system charging state-of-power value and the electric energy storage system discharging state-of-power value. Purely by way of example, if charging of the electric energy storage system is expected, it may suffice to determine the electric energy storage system charging state-of-power value.

However, it is also contemplated that embodiments of the present disclosure will determine both the electric energy storage system charging state-of-power value and the electric energy storage system discharging state-of-power value.

Various embodiments of the method according to the present disclosure will be presented hereinbelow. In particular, emphases are put on the determination and use of the load distribution amongst the battery units 24, 26 of the electric energy storage system 18.

According to embodiments of the present disclosure, the step of determining the load distribution comprises determining a load sharing factor $\delta_i(k)$ for each one of the battery units. The load sharing factor $\delta_i(k)$ is indicative of the proportion of the total electric load of the electric energy storage system being imparted on the battery unit 24, 26. Since the load sharing portion may be time dependent, the load sharing function is hereinafter indicated by $\delta_i(k)$ wherein index i indicates the number of the battery unit and k is a measure indicative of the time instant. Here, it should be noted that k may indicate an actual time, such that k may be a continuous parameter, or k may be indicative of a number of time steps, each one of which having a certain length $t_k$.

It should also be noted that in embodiments of the method of the present disclosure, the load sharing factors $\delta_i(k)$ may be determined without taking temporal variations in the electric loads into account. In such a scenario, load sharing factor may be indicated as bi. However, for the sake of completeness, load sharing factors are written as $\delta_i(k)$ below. In a similar vein, the electric load reference value $L_{ref}$, as well as the battery unit measured load value $L_1$, $L_2$ and also the electric energy storage system state-of-power value $SOP_{ESS}$ may be time dependent and may thus also be written as $L_{ref}(k)$, $L_i(k)$ and $SOP_{ESS}(k)$ below.

According to embodiments of the present disclosure, the load sharing factor $\delta_i(k)$ may be determined by determining an electric load reference value $L_{ref}(k)$ indicative of the total electric load actually imparted on the electric energy storage system 18. Purely by way of example, the electric load reference value $L_{ref}(k)$ may be a value indicative of the total electric load imparted on the electric energy storage system 18. Put differently, the electric load reference value $L_{ref}(k)$ may be formed by summing the electric load over each battery unit in the in the electric energy storage system 18. As another non-limiting alternative, the electric load reference value $L_{ref}(k)$ may be indicative of the average electric load over each battery unit in the electric energy storage system 18.

As such, using the electric current as an example of the electric load, the electric load reference value $L_{ref}(k)$ may for instance be expressed as:

$$L_{ref}(k) = I_{tot}(k) = \sum_{i=1}^{n} I_i(k) \qquad \text{Eq. 15}$$

i.e. the electric load reference value $L_{ref}(k)$ may be the sum of the electric load imparted on each battery unit. As such, in the above equation, n is the number of battery units of the electric energy storage system 18. Alternatively, the load reference value $L_{ref}(k)$ may for instance be expressed as $$L_{ref}(k) = I_{avg}(k) = \frac{1}{n}\sum_{i=1}^{n} I_i(k) \qquad \text{Eq. 16}$$

i.e. the electric load reference value $L_{ref}$ may be the average electric load imparted on each battery unit. Here, it should again be noted that the electric load, exemplified by electric current in the above examples, may be an electric charging load or a electric discharging load.

Moreover, the determination of the sharing factor $\delta_i(k)$ may further comprise determining whether or not a load sharing condition is fulfilled. The load sharing condition comprises that the magnitude of the electric load reference value is greater than or equal to a predetermined first threshold value, e.g.

$$|L_{ref}(k)| \geq \beta_1 \qquad \text{Eq. 17}$$

The first threshold value $\beta_1$ may be selected on the basis of the electric energy storage system 18. Moreover, the first threshold value $\beta_1$ may be different between a charging load and discharging load as has been intimated above. Furthermore, the first threshold value R may be a non-negative quantity.

The method may further comprise, for each battery unit: in response to the load sharing condition being fulfilled, setting the load sharing factor $\delta_i(k)$ for the battery unit to the ratio between the electric load reference value and the battery unit measured load value, e.g. in accordance with the following:

$$\delta_i(k) = \frac{L_{ref}(k)}{L_i(k)} \qquad \text{Eq. 18}$$

As may be realized from the above, the value of the load sharing factor $\delta_i(k)$ will increase with a decreasing value of the battery unit measured load value $L_i(k)$ for the same load reference value $L_{ref}(k)$.

In addition to the above, the load sharing factor $\delta_i(k)$ may further be determined in accordance with the following for each battery unit: in response to the load sharing condition not being fulfilled, setting the load sharing factor $\delta_i(k)$ for the battery unit to a predetermined load sharing parameter, preferably the predetermined load sharing parameter is equal to one. As such, combining the above, two alternatives, the load sharing factor $\delta_i(k)$ may be determined in accordance with the following.

$$\delta_i(k) = \begin{cases} \dfrac{L_{ref}(k)}{L_i(k)} & \text{load sharing condition is fulfilled} \\ C_\delta & \text{load sharing condition is not fulfilled} \end{cases} \qquad \text{Eq. 19}$$

Purely by way of example, the predetermined load sharing parameter C may be used for adapting a conservative approach when determining the load sharing factor for a battery unit and subsequently when determining an electric energy storage system state-of-power value $SOP_{ESS}$; $SOP_{ESS}(k)$.

In embodiments of the method, the load sharing condition may comprise terms in addition to the one discussed above. Purely by way of example, the load sharing condition may be individual for each battery unit and my further comprises that a magnitude of the battery unit measured load value is greater than or equal to a predetermined second threshold value, e.g.

$$|L_i(k)| \geq \beta_2 \qquad \text{Eq. 20}$$

As may be gleaned from the above, the predetermined second threshold value is preferably greater than zero. Purely by way of example, the second threshold value may be set in dependence of the battery unit, e.g. the type and model, concerned.

Instead of, or in addition to, the above, the load sharing condition may be individual for each battery unit and may further comprise that a magnitude of the battery unit measured load value is greater than or equal to a magnitude of the battery unit state-of-power value multiplied by a predetermined third threshold value, preferably the predetermined third threshold value is in the range of zero to one, e.g.

$$|L_i(k)| \geq \beta_3 \cdot SOP_i(k) \qquad \text{Eq. 21}$$

Again, as has been discussed hereinabove, it should be noted that the battery unit may actually have two different battery unit state-of-power values, viz one value for charging and one for discharging. Moreover, it should not be overlooked that the electric load during charging is generally regarded as being positive whereas the electric load during discharging is negative. As such, the last implementation of the load sharing condition portion may be reformulated as:

$$L_i(k) \geq \beta_3 \cdot SOP_{i,charge}(k) \text{ OR } L_i(k) \leq \beta_3 \cdot SOP_{i,discharge}(k) \qquad \text{Eq. 22}$$

The above example portions of the load sharing condition may be combined using AND statements. Purely by way of example, all three portions may be combined, e.g. in accordance with the following:

$$|L_{ref}(k)| \geq \beta_1 \text{ AND}$$
$$|L_i(k)| \geq \beta_2 \text{ AND} \qquad \text{Eq. 23}$$
$$|L_i(k)| \geq \beta_3 \cdot SOP_i(k)$$

Using the differences in state-of-power for charging and discharging, the combined load sharing condition may be formulated in accordance with the following:

$$|L_{ref}(k)| \geq \beta_1 \text{ AND}$$
$$|L_i(k)| \geq \beta_2 \text{ AND} \qquad \text{Eq. 24}$$
$$L_i(k) \geq \beta_3 \cdot SOP_{i,charge}(k) \text{ OR } L_i(k) \leq \beta_3 \cdot SOP_{i,discharge}(k)$$

Irrespective of which load sharing condition being used, the load sharing factors $\delta_i(k)$ thus determined may be used for determining the electric energy storage system state-of-power value $SOP_{ESS}(k)$.

As such, though purely by way of example, the step of determining the electric energy storage system state-of-power value $SOP_{ESS}(k)$ may comprise, for each battery unit 24, 26 in the electric energy storage system 18, determining a battery unit product $BUP_i(k)$ by multiplying the battery unit state-of-power value and the load sharing factor in accordance with the following:

$$BUP_i(k) = \delta_i(k) \cdot SOP_i(k) \qquad \text{Eq. 25}$$

As may be realized when studying the above equation, the load sharing factor $\delta_i(k)$ will increase with a decreasing load imparted on the battery unit, assuming that the load sharing condition is fulfilled, see e.g Eq. 18. Furthermore, as has been intimated hereinabove, the battery unit state-of-power value $SOP_i(k)$ is indicative of the maximum amount of electric load that the battery unit can deliver or receive at a constant load level during the predetermined future time range without violating electro-thermal limits of the battery unit 24, 26.

Thus, for a certain time instant k and for a certain battery unit i, the battery unit state-of-power value $SOP_i(k)$ may be low. At the same time, the electric load actually imparted on the battery unit may also be low, the consequence of which being that the load sharing factor $\delta_i(k)$ will be relatively high. This will in turn result in a battery unit product $BUP_i(k)$ which for instance may be around average amongst the battery units of the electric energy storage system 18.

On the other hand, if the battery unit state-of-power value $SOP_i(k)$ is low and the electric load actually imparted on the battery unit is high, this will result in a low battery unit state-of-power value $SOP_i(k)$ as well as a low the load sharing factor $\delta_i(k)$, as a consequence of which the battery unit product $BUP_i(k)$ may be low.

As may be realized from the above, battery unit product $BUP_i(k)$ presents relevant information when determining the electric energy storage system state-of-power value $BUP_{ESS}(k)$. Purely by way of example, the step of determining the electric energy storage system state-of-power value $BUP_{ESS}(k)$ may comprise using the battery unit product, among the battery unit products $BUP_i(k)$, which is closest to zero for determining the electric energy storage system state-of-power value, in accordance with the following:

$$BUP_{ESS}(k) \sim \min_{i \in (1,\ldots,n)} \{|BUP_i(k)|\} \qquad \text{Eq. 26}$$

The above relation may be used in different manners, depending on e.g. whether the load sharing factor has been determined using e.g. Eq. 15 or Eq. 16 hereinabove.

In the event that Eq. 15 is used, the electric energy storage system state-of-power value $BUP_{ESS}(k)$ may be determined in accordance with the following:

$$BUP_{ESS}(k) = \min_{i \in (1,\ldots,n)} \{|BUP_i(k)|\} \qquad \text{Eq. 27}$$

On the other hand, in the event that Eq. 16 be used instead, the electric energy storage system state-of-power value $BUP_{ESS}(k)$ may be determined in accordance with the following:

$$BUP_{ESS}(k) = n \cdot \min_{i \in (1,\ldots,n)} \{|BUP_i(k)|\} \qquad \text{Eq. 28}$$

Eq. 27 and Eq. 28 above are exemplified further below.

In a first example, the battery unit state-of-power value may be a battery unit state of charging power value and the electric energy storage system state-of-power value is an electric energy storage system state of charging power value. In fact, in the first example, the battery unit state-of-power value $SOP_i$ is a battery unit state of charging current value $I_{i,charge}^{max}(k)$ and the electric energy storage system state-of-power value is an electric energy storage system state of charging current value $I_{ESS,charge}^{max}(k)$. Moreover, the battery unit measured load value may be indicative of the electric current actually imparted on a battery unit at a certain time instant, i.e. $L_i(k)=l_i(k)$. As another non-limiting example, the battery unit measured load value may be indicative of electric power, e.g. $P_i(k)=I_i(k) \cdot V_i(k)$.

Using the above assumptions, the electric energy storage system state of charging current value $I_{ESS,charge}^{max}(k)$ may be determined in accordance with the following:

$$I_{ESS,charge}^{max}(k) = \min_{i \in (1,\ldots,n)} \{\delta_i(k) \cdot I_{i,charge}^{max}(k)\} \quad \text{Eq. 29}$$

wherein $$\delta_i(k) = \begin{cases} \dfrac{\sum_{i=1}^n L_i(k)}{I_i(k)} & \text{load sharing condition is fulfilled} \\ C_\delta & \text{load sharing condition is not fulfilled} \end{cases} \quad \text{Eq. 30}$$

if e.g. the electric load reference value $L_{ref}(k)$ is determined in accordance with Eq. 15 hereinabove. In the event that Eq. 16 be used instead, the electric energy storage system state of charging current value $I_{ESS,charge}^{max}(k)$ may be determined in accordance with the following:

$$I_{ESS,charge}^{max}(k) = n \cdot \min_{i \in (1,\ldots,n)} \{\delta_i(k) \cdot I_{i,charge}^{max}(k)\} \quad \text{Eq. 31}$$

wherein $$\delta_i(k) = \begin{cases} \dfrac{I_{avg}(k)}{I_i(k)} & \text{load sharing condition is fulfilled} \\ C_\delta & \text{load sharing condition is not fulfilled} \end{cases} \quad \text{Eq. 32}$$

In a second example, the battery unit state-of-power value may be a battery unit state of discharging power value and the electric energy storage system state-of-power value is an electric energy storage system state of discharging power value. In fact, in the second example, the battery unit state-of-power value $SOP_i$ is a battery unit state of discharging current value $I_{i,discharge}^{max}(k)$ and the electric energy storage system state-of-power value is an electric energy storage system state of discharging current value $I_{ESS,discharge}^{max}(k)$. Moreover, the battery unit measured load value may be indicative of the electric current actually imparted on a battery unit at a certain time instant, i.e. $L_i(k)=l_i(k)$.

Using the above assumptions, the electric energy storage system state of discharging current value $I_{ESS,discharge}^{max}(k)$ may be determined in accordance with the following:

$$I_{ESS,discharge}^{max}(k) = \max_{i \in (1,\ldots,n)} \{\delta_i(k) \cdot I_{i,discharge}^{max}(k)\} \quad \text{Eq. 33}$$

wherein $$\delta_i(k) = \begin{cases} \dfrac{\sum_{i=1}^n L_i(k)}{I_i(k)} & \text{load sharing condition is fulfilled} \\ C_\delta & \text{load sharing condition is not fulfilled} \end{cases} \quad \text{Eq. 34}$$

if e.g. the electric load reference value $L_{ref}(k)$ is determined in accordance with Eq. 15 hereinabove. As may be realized when comparing Eq. 33 and Eq. 34 to Eq. 31 and Eq. 32, the minimum function in Eq. 31 is replaced by a maximum function in Eq. 33. This is since the discharging current is considered as negative as a convention here, as a consequence of which the maximum term $\delta_i(k) \cdot I_{i,discharge}^{max}(k)$ will result in the smallest absolute value thereof.

In the event that Eq. 16 be used instead, the electric energy storage system state of discharging current value $I_{ESS,discharge}^{max}(k)$ may be determined in accordance with the following:

$$I_{ESS,discharge}^{max}(k) = n \cdot \max_{i \in (1,\ldots,n)} \{\delta_i(k) \cdot I_{i,discharge}^{max}(k)\} \quad \text{Eq. 35}$$

wherein $$\delta_i(k) = \begin{cases} \dfrac{I_{avg}(k)}{I_i(k)} & \text{load sharing condition is fulfilled} \\ C_\delta & \text{load sharing condition is not fulfilled} \end{cases} \quad \text{Eq. 36}$$

It should also be noted that the method according that the present disclosure may further comprise:

For each one of a plurality of time instants (k), determining an electric energy storage system state-of-power value $SOP_{ESS}(k)$ for that time instant using the method according to the present disclosure. Purely by way of example, the electric energy storage system state-of-power value $SOP_{ESS}(k)$ for each time instant may be determined using any one of the method embodiments presented hereinabove.

Determining the electric energy storage system state-of-power value by applying a filter, preferably a low pass filter and/or a weighted moving average filter, to the electric energy storage system state-of-power values $SOP_{ESS}(k)$ for the plurality of time instants (k).

As may be realized from the above, the electric energy storage system state-of-power value may be determined in a plurality of different ways. Irrespective of how such a value has been determined, it is envisaged that the value may be used in a method for controlling the loading of an electric energy storage system comprising at least two battery units electrically connected in parallel to each other. Such a method comprises determining the electric energy storage system state-of-power value according to the first aspect of the present disclosure, for instance in accordance with any one of the examples above, and imparting an electric load, which for instance may be expressed in terms of electric power or electric current, on the energy storage system 18 in dependence on the thus determined electric energy storage system state-of-power value.

Purely by way of example, imparting an electric load on the energy storage system in dependence on the thus determined electric energy storage system state-of-power value may comprise imparting an electric load the absolute value of which being smaller than or equal to the absolute value of the thus determined electric energy storage system state-of-power value.

The method according to the first or second aspect may be implemented by a computer program. As such, third aspect of the present disclosure relates to a computer program comprising program code means for performing the steps of the first or second aspect of the present disclosure when the program is run on a computer. In a similar vein, a fourth aspect of the present disclosure relates to a computer readable medium carrying a computer program comprising program means for performing the steps of the first or second aspect of the present disclosure when the program means is run on a computer.

It is to be noted that the present disclosure is not limited to the embodiments described hereinabove and illustrated in the drawings; rather the skilled person will recognize that many changes and modifications may be made within the scope of the appended claims. For example, although the present disclosure has mainly been described in relation to a bus, the disclosure should be equally applicable to any type of vehicle, such as any type of electrical vehicle. In fact, the present disclosure may be used for any type of energy storage system.

The invention claimed is:

1. A method for determining an electric energy storage system state-of-power value, said electric energy storage system comprising at least two battery units electrically connected in parallel to each other and said electric energy storage system state-of-power value being indicative of the total maximum amount of electric load that an electric energy storage system can deliver or receive at a constant load level during a predetermined future time range without a state-of-power value being outside state-of-power limits, for any one of said battery units, the method comprising:
for each battery unit in said electric energy storage system, determining said battery unit state-of-power value, said battery unit state-of-power value being indicative of the maximum amount of electric load that the battery unit can deliver or receive at a constant load level during said predetermined future time range without a temperature of said battery unit being outside temperature limits of said battery unit,
for each battery unit in said electric energy storage system, obtaining a battery unit measured load value indicative of the electric load actually imparted on said battery unit at a certain time instant,
on the basis of the battery unit measured load value for each battery unit in said electric energy storage system, determining a load distribution amongst said battery units of said electric energy storage system, wherein the step of determining said load distribution comprises determining a load sharing factor for each one of said battery units, said load sharing factor being indicative of the proportion of the total electric load of said electric energy storage system being imparted on said battery unit, and
determining said electric energy storage system state-of-power value on the basis of said battery unit state-of-power values and on said load distribution, wherein the step of determining said electric energy storage system state-of-power value comprises, for each battery unit in said electric energy storage system, determining a battery unit product by multiplying said battery unit state-of-power value and said load sharing factor.

2. The method according to claim 1, wherein said load sharing factor is determined in accordance with the following:
determining an electric load reference value indicative of the total electric load actually imparted on said electric energy storage system,
determining whether or not a load sharing condition is fulfilled, said load sharing condition comprising that the magnitude of said electric load reference value is greater than or equal to a predetermined first threshold value, and
for each battery unit:
i. in response to said load sharing condition being fulfilled, setting the load sharing factor for the battery unit to the ratio between said electric load reference value and the battery unit measured load value.

3. The method according to claim 2, wherein said load sharing factor is further determined in accordance with the following:
for each battery unit:
ii. in response to said load sharing condition not being fulfilled, setting the load sharing factor for the battery unit to a predetermined load sharing parameter.

4. The method according to claim 2, wherein said load sharing condition is individual for each battery unit and further comprises that a magnitude of said battery unit measured load value is greater than or equal to a predetermined second threshold value.

5. The method according to claim 2, wherein said load sharing condition is individual for each battery unit and further comprises that a magnitude of said battery unit measured load value is greater than or equal to a magnitude of said battery unit state-of-power value multiplied by a predetermined third threshold value.

6. The method according to claim 1, wherein the step of determining said electric energy storage system state-of-power value comprises using the battery unit product, among said battery unit products, which is closest to zero for determining the electric energy storage system state-of-power value.

7. The method according to claim 1, wherein said battery unit state-of-power value is a battery unit state of charging power value and said electric energy storage system state-of-power value is an electric energy storage system state of charging power value.

8. The method according to claim 7, wherein the step of determining said electric energy storage system state-of-power value comprises using the smallest battery unit product, among said battery unit products, for determining the electric energy storage system state-of-power value.

9. The method according to claim 1, wherein said battery unit state-of-power value is a battery unit state of discharging power value and said electric energy storage system state-of-power value is an electric energy storage system state of discharging power value.

10. The method according to claim 7, wherein the step of determining said electric energy storage system state-of-power value comprises using the largest battery unit product, among said battery unit products, for determining the electric energy storage system state-of-power value.

11. The method according to claim 1, wherein said method comprises:
for each one of a plurality of time instants (k), determining an electric energy storage system state-of-power value $SOP_{ESS}(k)$ for that time instant using the method, and
determining said electric energy storage system state-of-power value by applying a filter to said electric energy storage system state-of-power values $SOP_{ESS}(k)$ for said plurality of time instants (k).

12. A method for controlling the loading of an electric energy storage system comprising at least two battery units electrically connected in parallel to each other, the method comprising determining the electric energy storage system state-of-power value according to claim 1, and imparting an electric load on said energy storage system in dependence on the thus determined electric energy storage system state-of-power value.

13. The method according to claim 10, wherein imparting an electric load on said energy storage system in dependence on the thus determined electric energy storage system state-of-power value comprises imparting an electric load, the absolute value of which being smaller than or equal to the absolute value of the thus determined electric energy storage system state-of-power value.

14. The method according to claim 1, wherein said battery unit measured load value is indicative of the electric current, alternatively electric power, actually imparted on said battery unit at a certain time instant.

15. The method according to claim 1, wherein said electric energy storage system state-of-power value is indicative of the total maximum amount of electric current, alternatively electric power, that an electric energy storage system can deliver or receive at a constant load level during said predetermined future time range without a state-of-power value being outside state-of-power limits, for any one of said battery units and wherein said battery unit state-of-power value is indicative of the maximum amount of electric current, alternatively electric power, that the battery unit can deliver or receive at a constant load level during said predetermined future time range without a temperature of said battery unit being outside temperature limits of said battery unit.

16. A non-transitory computer readable medium carrying a computer program comprising program code for performing the method of claim 1 when said program code is run on a computer.

17. A battery management system for an electric energy storage system comprising at least two battery units electrically connected in parallel to each other, the battery management system being adapted to determine an electric energy storage system state-of-power value, said electric energy storage system state-of-power value being indicative of the total maximum amount of electric load that an electric energy storage system can deliver or receive at a constant load level during a predetermined future time range without a state-of-power value being outside state-of-power limits, for any one of said battery units, in accordance with the following:
    for each battery unit in said electric energy storage system, determine said battery unit state-of-power value, said battery unit state-of-power value being indicative of the maximum amount of electric load that the battery unit can deliver or receive at a constant level during said predetermined future time range without a temperature of said battery unit being outside temperature limits of said battery unit,
    for each battery unit in said electric energy storage system, receive a battery unit measured load value indicative of the electric load actually imparted on said battery unit at a predetermined time instant,
    on the basis of the measured load value for each battery unit in said electric energy storage system, determine a load distribution amongst said battery units of said electric energy storage system, wherein the battery management system is adapted to determine said load distribution using a procedure that comprises determining a load sharing factor for each one of said battery units, said load sharing factor being indicative of the proportion of the total electric load of said electric energy storage system being imparted on said battery unit, and
    determine said electric energy storage system state-of-power value on the basis of said battery unit state-of-power values and on said load distribution, wherein the battery management system is adapted to determine said electric energy storage system state-of-power value using a procedure that comprises, for each battery unit in said electric energy storage system, determining a battery unit product by multiplying said battery unit state-of-power value and said load sharing factor.

18. The battery management system according to claim 17, wherein said battery management system is adapted to determine said load sharing factor in accordance with the following:
    determining an electric load reference value indicative of the total electric load actually imparted on said electric energy storage system,
    determining whether or not a load sharing condition is fulfilled, said load sharing condition comprising that the absolute value of said electric load reference value is greater than or equal to a predetermined first threshold value, and
    for each battery unit:
        i. in response to said load sharing condition being fulfilled, setting the load sharing factor for the battery unit to the ratio between said electric load reference value and the battery unit measured load value.

19. The battery management system according to claim 18, wherein said battery management system further is adapted to determine said load sharing factor accordance with the following:
    for each battery unit:
        ii. in response to said load sharing condition not being fulfilled, setting the load sharing factor for the battery unit to a predetermined load sharing parameter.

20. The battery management system according to claim 18, wherein said load sharing condition is individual for each battery unit and further comprises that a magnitude of said battery unit measured load value is greater than or equal to a predetermined second threshold value.

21. The battery management system according to claim 18 wherein said load sharing condition is individual for each battery unit and further comprises that a magnitude of said battery unit measured load value is greater than or equal to a magnitude of said battery unit state-of-power value multiplied by a predetermined third threshold value.

22. The battery management system according to claim 18, wherein the battery management system is adapted to determine said electric energy storage system state-of-power value by using a procedure that comprises using the battery unit product, among said battery unit products, which is closest to zero for determining the electric energy storage system state-of-power value.

23. The battery management system according to claim 18, wherein said battery unit state-of-power value is a battery unit state of charging power value and said electric energy storage system state-of-power value is an electric energy storage system state of charging power value.

24. The battery management system according to claim 23, wherein the battery management system is adapted to determine said electric energy storage system state-of-power value by using a procedure that comprises using the smallest battery unit product, among said battery unit products, for determining the electric energy storage system state-of-power value.

25. The battery management system according to claim 17, wherein said battery unit state-of-power value is a battery unit state of discharging power value and said electric energy storage system state-of-power value is an electric energy storage system state of discharging power value.

26. The battery management system according to claim 25, wherein the battery management system is adapted to determine said electric energy storage system state-of-power value using a procedure that comprises using the largest battery unit product, among said battery unit products, for determining the electric energy storage system state-of-power value.

27. The battery management system according to claim 17, wherein said battery management system is adapted to:
for each one of a plurality of time instants (k), determining an electric energy storage system state-of-power value $SOP_{ESS}(k)$ for that time instant, and
determine said electric energy storage system state-of-power value by applying a filter to said electric energy storage system state-of-power values $SOP_{ESS}(k)$ for said plurality of time instants (k).

28. The battery management system according to claim 17, wherein said battery management system is adapted to impart an electric load on said energy storage system in dependence on said determined electric energy storage system state-of-power value.

29. The battery management system according to claim 28, wherein the battery management system is adapted to impart an electric load on said energy storage system in dependence on the thus determined electric energy storage system state-of-power value by imparting an electric load the absolute value of which being smaller than or equal to the absolute value of the thus determined electric energy storage system state-of-power value.

30. The battery management system according to claim 17, wherein said battery unit measured load value is indicative of the electric current, alternatively electric power, actually imparted on said battery unit at a certain time instant.

31. The battery management system according to claim 17, wherein said electric energy storage system state-of-power value is indicative of the total maximum amount of electric current, alternatively electric power, that an electric energy storage system can deliver or receive at a constant load level during said predetermined future time range without a state-of-power value being outside state-of-power limits for any one of said battery units and wherein said battery unit state-of-power value is indicative of the maximum amount of electric current, alternatively electric power, that the battery unit can deliver or receive at a constant load level during said predetermined future time range without a temperature of said battery unit being outside temperature limits of said battery unit.

32. An electric energy storage system comprising at least two battery units electrically connected in parallel to each other, said electric energy storage system further comprising a battery management system according to claim 17.

33. A vehicle comprising a battery management system according to claim 17 and/or an electric energy storage system.

* * * * *